United States Patent [19]

Honma

[11] Patent Number: 5,286,159
[45] Date of Patent: Feb. 15, 1994

[54] MOBILE VEHICULAR APPARATUS WITH AERIAL WORKING DEVICE

[75] Inventor: Kazuyoshi Honma, Numata, Japan

[73] Assignee: Kabushiki Kaisha Aichi Corporation, Nagoya, Japan

[21] Appl. No.: 935,458

[22] Filed: Aug. 26, 1992

Related U.S. Application Data

[63] Continuation of Ser. No. 610,757, Nov. 8, 1990, abandoned.

[51] Int. Cl.$^5$ ............................................. B25J 3/00
[52] U.S. Cl. .................................... 414/728; 901/1; 901/8; 182/2
[58] Field of Search ............... 414/680, 718, 728, 4, 414/5; 182/2; 901/1, 8

[56] References Cited

U.S. PATENT DOCUMENTS

| | | | |
|---|---|---|---|
| 2,998,861 | 9/1961 | Hotchkiss | 182/2 |
| 3,809,180 | 5/1974 | Grove . | |
| 3,841,436 | 10/1974 | Grove . | |
| 3,866,713 | 2/1975 | Carpenter et al. . | |
| 4,088,200 | 5/1978 | Cowley et al. | 182/2 |
| 4,160,492 | 7/1979 | Johnston . | |
| 4,511,015 | 4/1985 | Purdy | 182/2 |
| 4,690,246 | 9/1987 | Hornagold et al. | 182/2 |
| 4,775,029 | 10/1988 | MacDonald et al. | 182/2 |
| 5,107,954 | 4/1992 | Fujimato | 182/2 |

FOREIGN PATENT DOCUMENTS

| | | |
|---|---|---|
| 61-81111 | 4/1986 | Japan . |
| 62-178108 | 8/1987 | Japan . |
| 62-268312 | 11/1987 | Japan . |
| 63-144995 | 9/1988 | Japan . |
| 63-173193 | 11/1988 | Japan . |
| 64-38273 | 3/1989 | Japan . |
| 64-38274 | 3/1989 | Japan . |
| 1-134912 | 9/1989 | Japan . |
| 1-231800 | 9/1989 | Japan . |
| 60-147923 | 10/1989 | Japan . |
| 2-28895 | 2/1990 | Japan . |
| 2-63992 | 5/1990 | Japan . |
| 2-91789 | 7/1990 | Japan . |
| 2-103089 | 8/1990 | Japan . |
| 2-104988 | 8/1990 | Japan . |
| 2-114308 | 9/1990 | Japan . |
| 2-115389 | 9/1990 | Japan . |
| 2-129108 | 10/1990 | Japan . |
| 2-262813 | 10/1990 | Japan . |
| 3-31195 | 3/1991 | Japan . |

Primary Examiner—Michael S. Huppert
Assistant Examiner—Donald W. Underwood
Attorney, Agent, or Firm—Sandler Greenblum & Bernstein

[57] ABSTRACT

A mobile vehicular apparatus includes an aerial control cabin mounted on a tip end of a telescopic boom by a vertical shaft for turning movement about the vertical shaft, and an aerial working device disposed in front of the aerial control cabin. The aerial control cabin is movable back and forth with respect to the boom by a slide mechanism. The slide mechanism includes a guide base mounted on the vertical shaft for turning movement thereabout, a slider mounted on the guide base so as to be movable back and forth with respect to the guide base, and an actuator for sliding the slider with respect to the guide base, the aerial control cabin being coupled to the slider.

6 Claims, 6 Drawing Sheets

MOBILE VEHICULAR APPARATUS WITH AERIAL WORKING DEVICE

This application is a continuation of application Ser. No. 07/610,757, filed Nov. 8, 1990, now abandoned.

BACKGROUND OF THE INVENTION

1. Field of the Invention

The present invention relates to a mobile vehicular apparatus which has a telescopic boom supporting on its tip end an aerial cabin or platform for carrying an operator, a manipulator device, and a working device such as a crane.

2. Description of the Prior Art

FIG. 7 of the accompanying drawings shows a conventional mobile vehicular apparatus, generally denoted at 50, which is arranged to perform various aerial jobs or tasks. The mobile vehicular apparatus 50 has a telescopic boom 51 with a cabin support shaft 52 vertically mounted on its tip end. The cabin support shaft 52 supports thereon an aerial control cabin 53 which can rotate with respect to the boom 51. The aerial control cabin 53 supports a manipulator device 55 which is forward of the cabin support shaft 52 and an auxiliary boom 54 above cabin support shaft 52. The control cabin 53 is movable in a spatial range that is a combination of the range in which the boom 51 can be raised and lowered, extended and contracted, and turned, and the range in which the control cabin 53 can be rotated about the cabin support shaft 52.

When the boom 51 is fixed in the position shown in FIG. 7 and a transformer 56 is suspended by the auxiliary boom 54, the auxiliary boom 54 is subjected to a considerable bending moment M because of the weight of the control cabin 53 and the weight of the transformer 56. If the control cabin 53 is turned while the transformer 56 is being suspended by the auxiliary boom 54, then the auxiliary 54 is also subjected to a large torsional moment T due to the above weights. As a result, a very high contact pressure is applied to a boom receiver C of the boom 51.

The mobile vehicular apparatus 50 is usually used to process or service "hot" or energized electric cables. Therefore, a distal boom member 51a of the boom 51 is normally made of FRP (Fiber Reinforced Plastic) which is a highly electrically insulating material. Because the FRP material selected for the distal boom member 51a must have excellent mechanical strength to withstand the contact pressure applied thereto, the boom 50 is expensive and requires careful maintenance.

FIG. 8 shows the manner in which aerial electric cables W1 through W3, corresponding to first, second, and third phases, are installed on a post using the mobile vehicular apparatus 50. For such installation, the mobile vehicular apparatus 50 is positioned as closely to the shoulder of the road as possible, the boom 51 is set to the best position, the control cabin 53 is rotated, and the manipulator device 55 or the auxiliary boom 54 is operated. The control cabin 53, the auxiliary boom 54, and the manipulator device 55 of the conventional design are rotatable in only a limited range about the vertical cabin support shaft 52. Therefore, when the control cabin 53 is held in the solid-line position in FIG. 8 and the manipulator device 55 is actuated to install the aerial electric cables W1 through W3, the manipulator device 55 often can install only first- and second-phase cables W1, W2 even if it is moved as far forwardly as possible toward the cables W1 through W3. In order to install the third-phase cable W3 that is located farthest from the manipulator device 50, the position of the mobile vehicular apparatus 50 must be changed and the boom 51 must be raised and lowered, extended and contracted, and turned once more until the control cabin 53 is repositioned at the position indicated by the imaginary lines in FIG. 8.

When the mobile vehicular apparatus 50 is to be thus moved, the outriggers for supporting the mobile vehicle have to be retracted and the control cabin 53 has to be lowered into a safe low position. Even if the control cabin 53 can be moved to the imaginary-line position through the adjustment of the boom 51 while the mobile vehicular apparatus 50 remains unchanged in position, the operator in the control cabin 53 is required to manipulate a plurality of control levers in a complex sequence. Such a control procedure is highly tedious and time-consuming to perform and also inefficient.

SUMMARY OF THE INVENTION

It is an object of the present invention to provide a mobile vehicular apparatus with an aerial working device and an aerial control cabin which are arranged to minimize bending and torsional moments that are applied thereby to a telescopic boom.

Another object of the present invention is to provide a mobile vehicular apparatus having an aerial manipulator device which can easily process or handle an object that is positioned remotely from an aerial control cabin supported on the tip end of a telescopic boom.

To achieve the above objects, there is provided a mobile vehicular apparatus comprising a boom, an aerial control cabin mounted on a tip end of the boom by a vertical shaft for turning movement about the vertical shaft, an aerial working device disposed in front of the aerial control cabin, and a slide mechanism for moving the aerial control cabin back and forth with respect to the boom.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
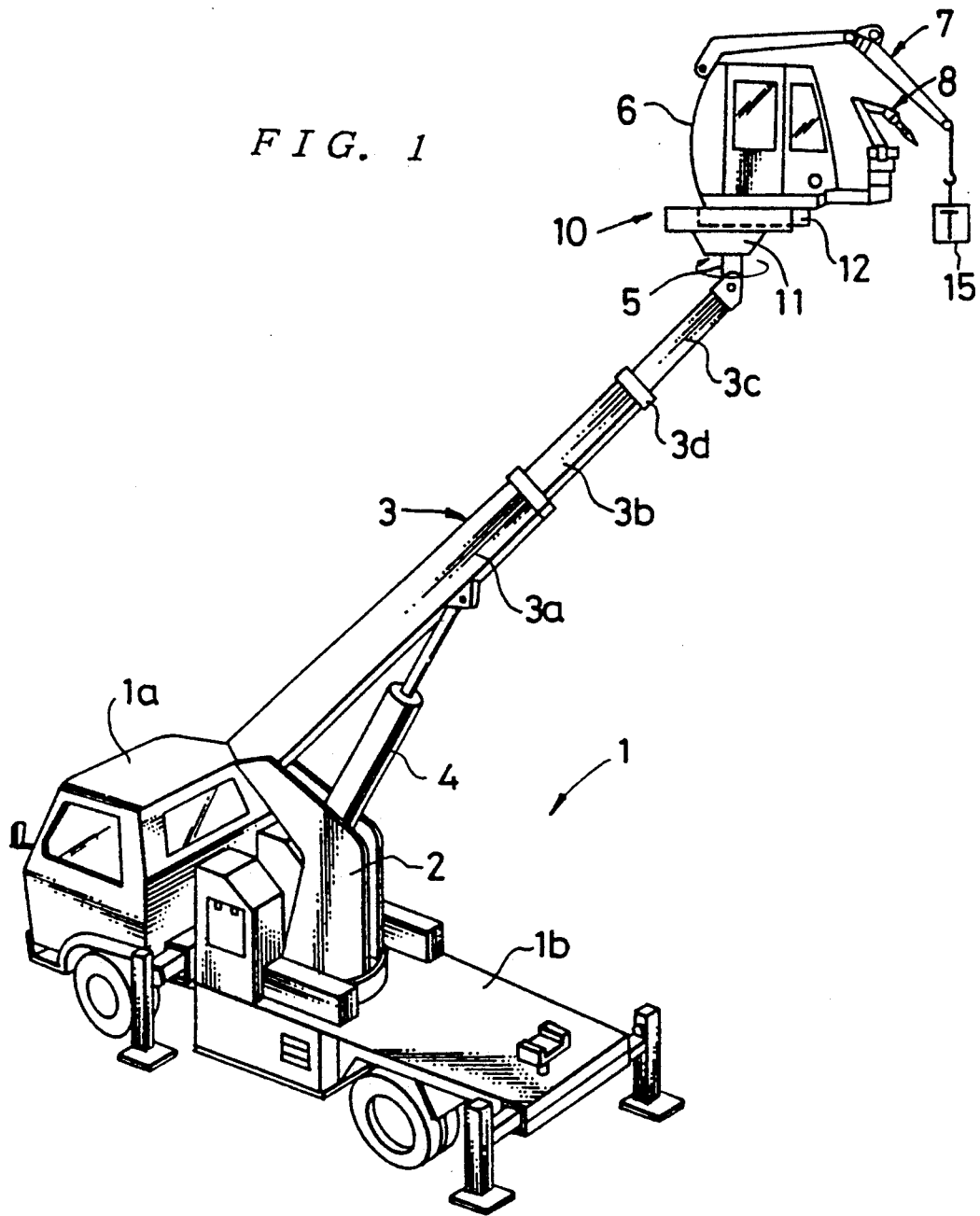
FIG. 1 is a perspective view of a mobile vehicular apparatus with an aerial working device according to a first embodiment of the present invention.

FIG. 1 shows a mobile vehicular apparatus with an aerial control cabin, incorporating an aerial working device according to the present invention.

The mobile vehicular apparatus includes a mobile vehicle 1 having a driver's cabin 1a and a vehicle body 1b. The vehicle body 1b supports a turntable 2 which can be turned by a turntable motor. On the turntable 2, there is mounted a telescopic boom 3 which is upwardly extensible and downwardly collapsible, i.e., vertically swingable, by a cylinder 4. The telescopic boom 3 comprises three boom members, i.e., a distal boom member 3c, an intermediate boom member 3b, and a proximal boom member 3a. The distal boom member 3c and the intermediate boom member 3b are slidably movable into and out of the proximal boom member 3a by a hydraulic cylinder disposed in the telescopic boom 3. An aerial control cabin 6 is mounted on a vertical cabin support shaft 5 through a slide mechanism 10 which is in turn mounted the tip end of the distal boom member 3c.

Figure 3:
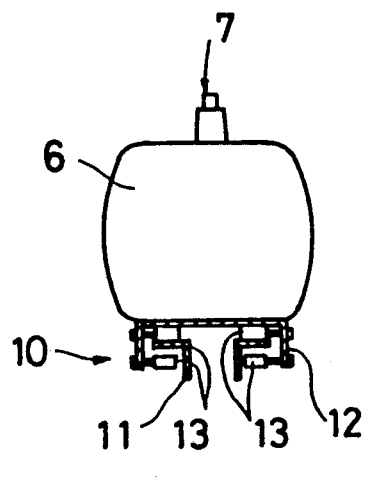
FIG. 3 is a sectional front elevational view of the aerial control cabin.
Figure 4:
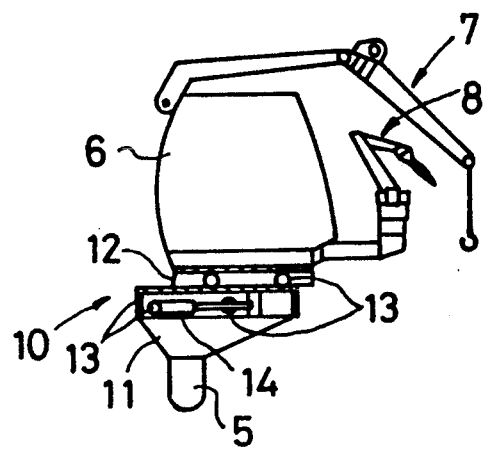
FIG. 4 is a sectional side elevational view of the aerial control cabin.

As shown in FIGS. 3 and 4, the slide mechanism 10 comprises a guide base 11 mounted on the cabin support shaft 5 allowing horizontal turning movement about the axis of the cabin support shaft 5, a slider 12 slidably mounted on the guide base 11 through a plurality of rollers 13 interposed therebetween, the slider 12 being slidable back and forth with respect to the guide base 11, and a slide cylinder 14 operatively coupled between the guide base 11 and the slider 12 for slidingly moving the slider 12 back and forth with respect to the guide base 11. The control cabin 6 is mounted on the slider 12. The cabin support shaft 5 is held vertically at all times irrespective of the angle through which boom 3 is tilted with respect to the vehicle body 1b. Therefore, the control cabin 6 can turn horizontally about the cabin support shaft 5 and move horizontally back and forth with the slider 12.

An aerial working device comprises a manipulator device 8 coupled to a lower front end of the control cabin 6, and an auxiliary boom 7 extending forwardly from an upper rear end of the control cabin 6. The auxiliary boom 7 comprises a hanger device or crane for hanging an object 15 such as a transformer to be installed on a post. The control cabin 6 is movable in a spatial range that is a combination of the range in which the boom 3 can be raised and lowered, extended and contracted, and turned, the range in which the control cabin 6 can be rotated about the cabin support shaft 5, and the range in which the control cabin 6 supported on the slide mechanism 10 is movable back and forth.

Figure 2:
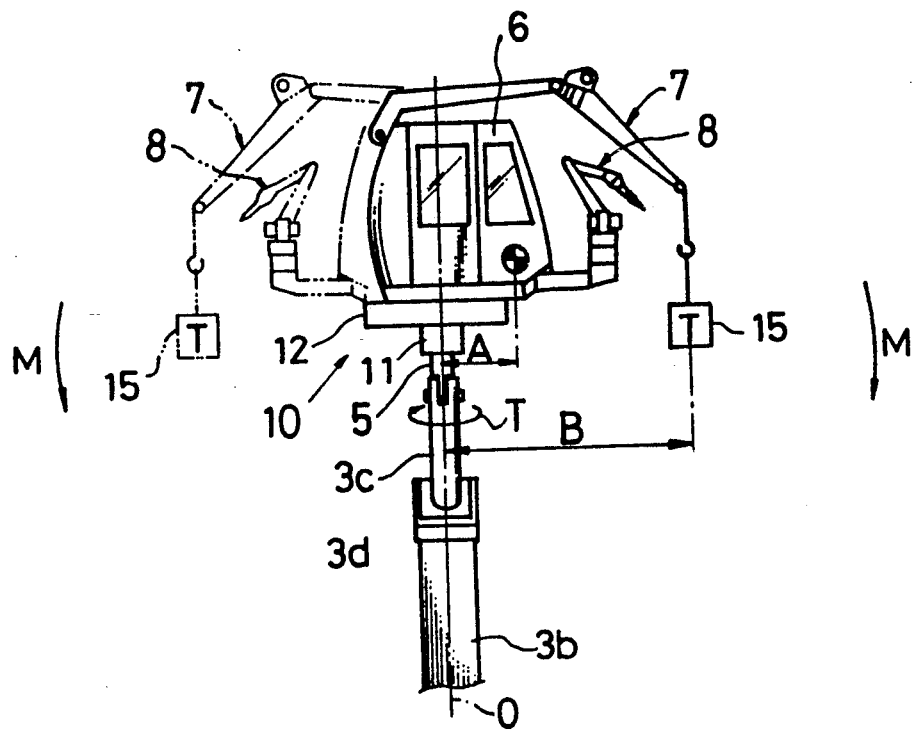
FIG. 2 is a front elevational view of an aerial control cabin and associated components of the mobile vehicular apparatus shown in FIG. 1.

Now, it is assumed that the boom 3 is tilted at a certain angle as shown in FIG. 1, the control cabin 6 is turned 90° in either of opposite horizontal directions as shown in FIG. 2, and the manipulator device 8 or the auxiliary boom 7 is operated to hang the transformer 15. In such an application, the bending and torsional moments applied to the boom 3 should desirably be minimized from the standpoint of safety and mechanical strength of the boom 3. More specifically, since the mobile vehicular apparatus is often used to process hot or energized electric cables, the distal boom member 3c is usually made of electrically insulating FRP (Fiber Reinforced Plastic). Therefore, moments exerted to the boom 3 should be reduced to a minimum in order to avoid any trouble which might otherwise be caused by the limited mechanical strength of the distal boom member 3c, particularly the contact pressure developed between the distal boom member 3c and a boom receiver 3d on the intermediate boom member 3b.

When the transformer 15 is to be suspended by the auxiliary boom 7, the control cabin 6 is slid rearwardly with respect to the boom 3 by the slide mechanism 10 in order to minimize the distance A between the central axis 0 of the boom 3 and the center of gravity of the control cabin 6 and also the distance B between the central axis 0 of the boom 3 and the center of gravity of the transformer 15, so that the bending moment M applied to the boom 3 will be reduced to a minimum. Therefore, the bending moment M imposed on the boom 3 is minimized, and the torsional moment T which is exerted to the boom 3 when it is turned about the cabin support shaft 5 is much smaller than that applied to the boom of the conventional mobile vehicular apparatus. As a result, the pressure developed between the distal boom member 3c and the boom receiver 3d on the intermediate boom member 3b is also reduced. Consequently, the FRP material for the distal boom member 3c is not required to be particularly high in mechanical strength as compared with that of the conventional distal boom member. The boom 3 is therefore lower in cost, but still safe, and the maintenance thereof is relatively easy to carry out.

A mobile vehicular apparatus with an aerial working device according to a second embodiment of the present invention will now be described with reference to FIGS. 5 and 6. Those parts shown in FIGS. 5 and 6 which are identical to those shown in FIGS. 1 through 4 are denoted by identical reference numerals.

Figure 5:
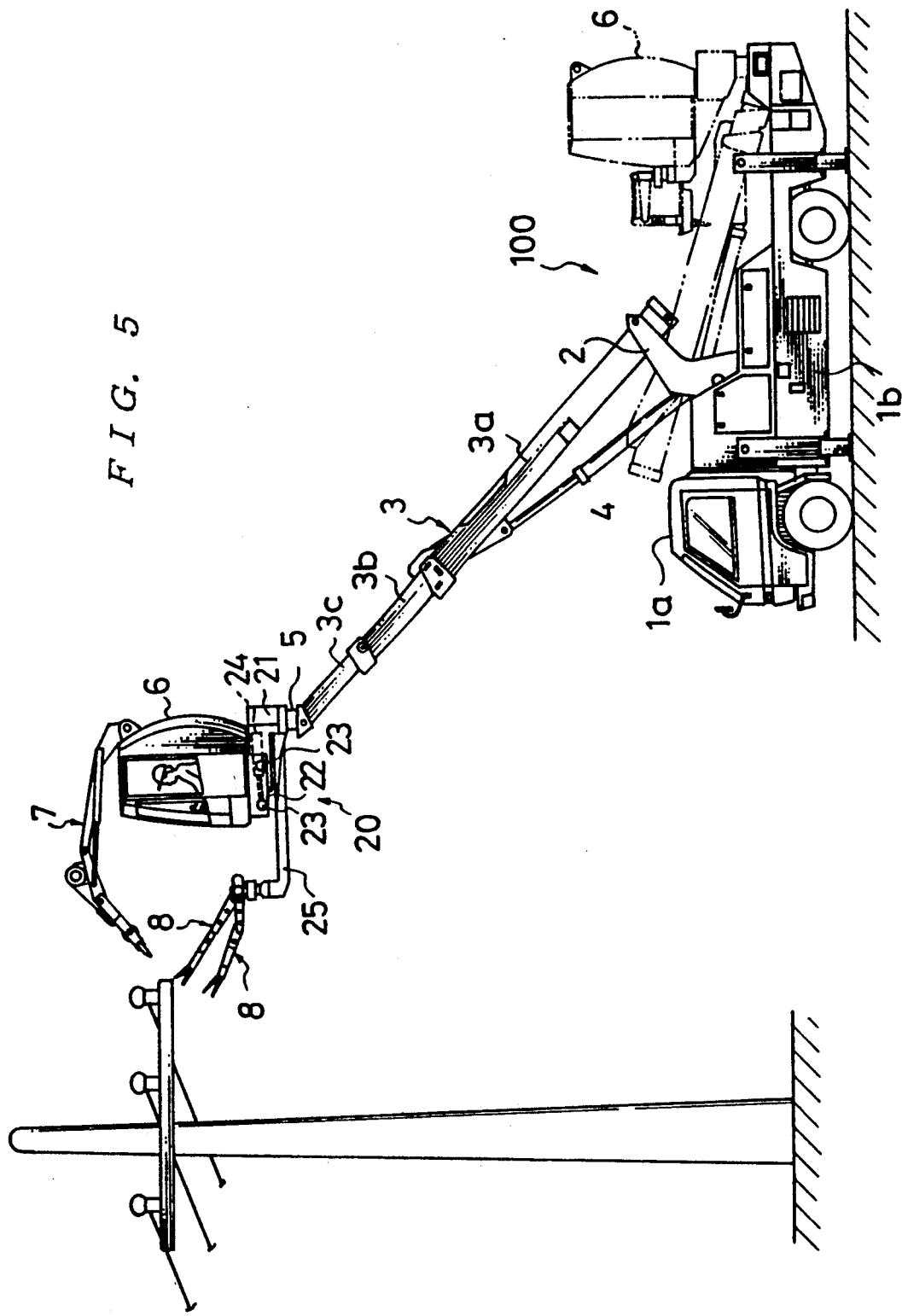
FIG. 5 is a side elevational view of a mobile vehicular apparatus with an aerial working device according to a second embodiment of the present invention.
Figure 6:
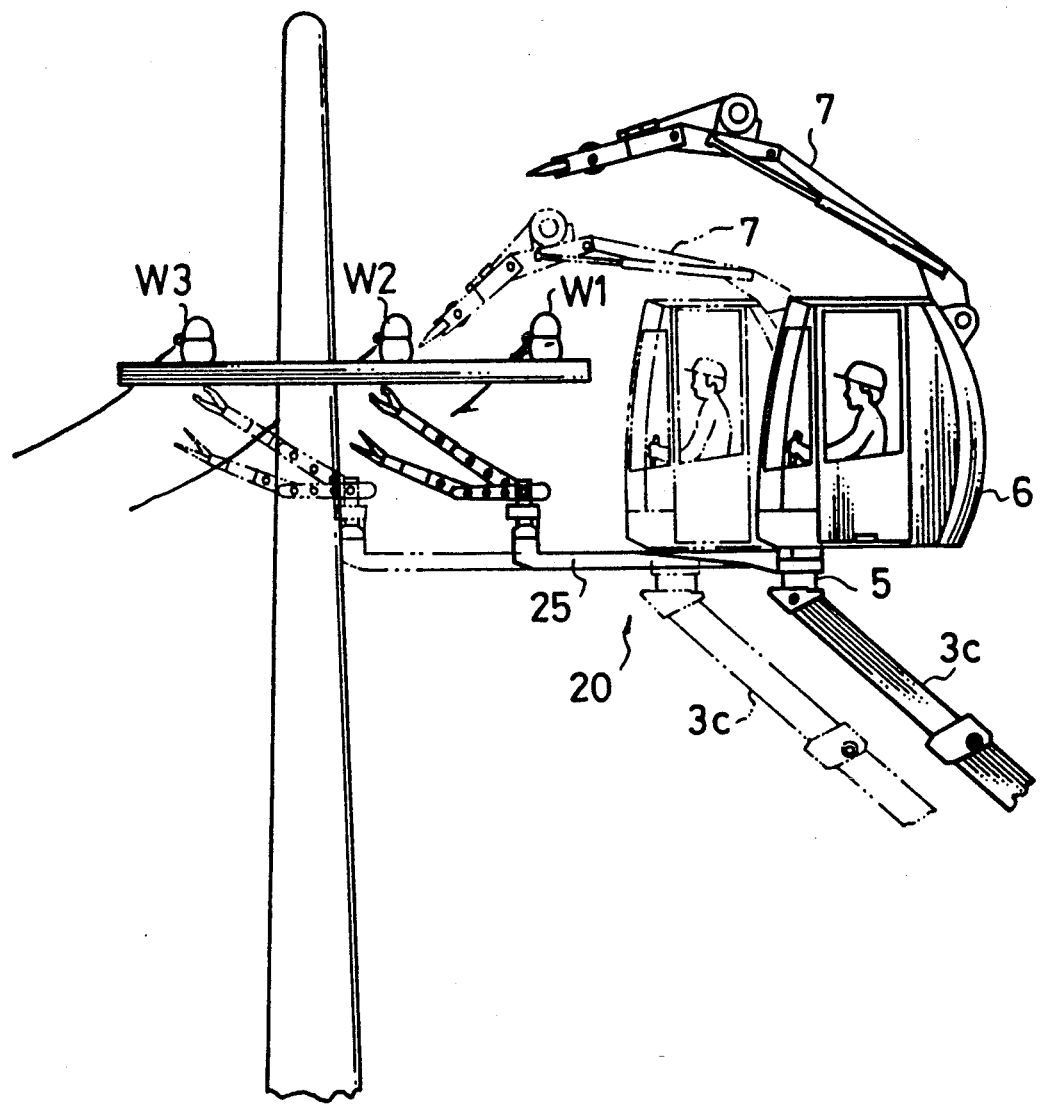
FIG. 6 is a side elevational view of an aerial control cabin and associated components of the mobile vehicular apparatus shown in FIG. 5.
Figure 7:
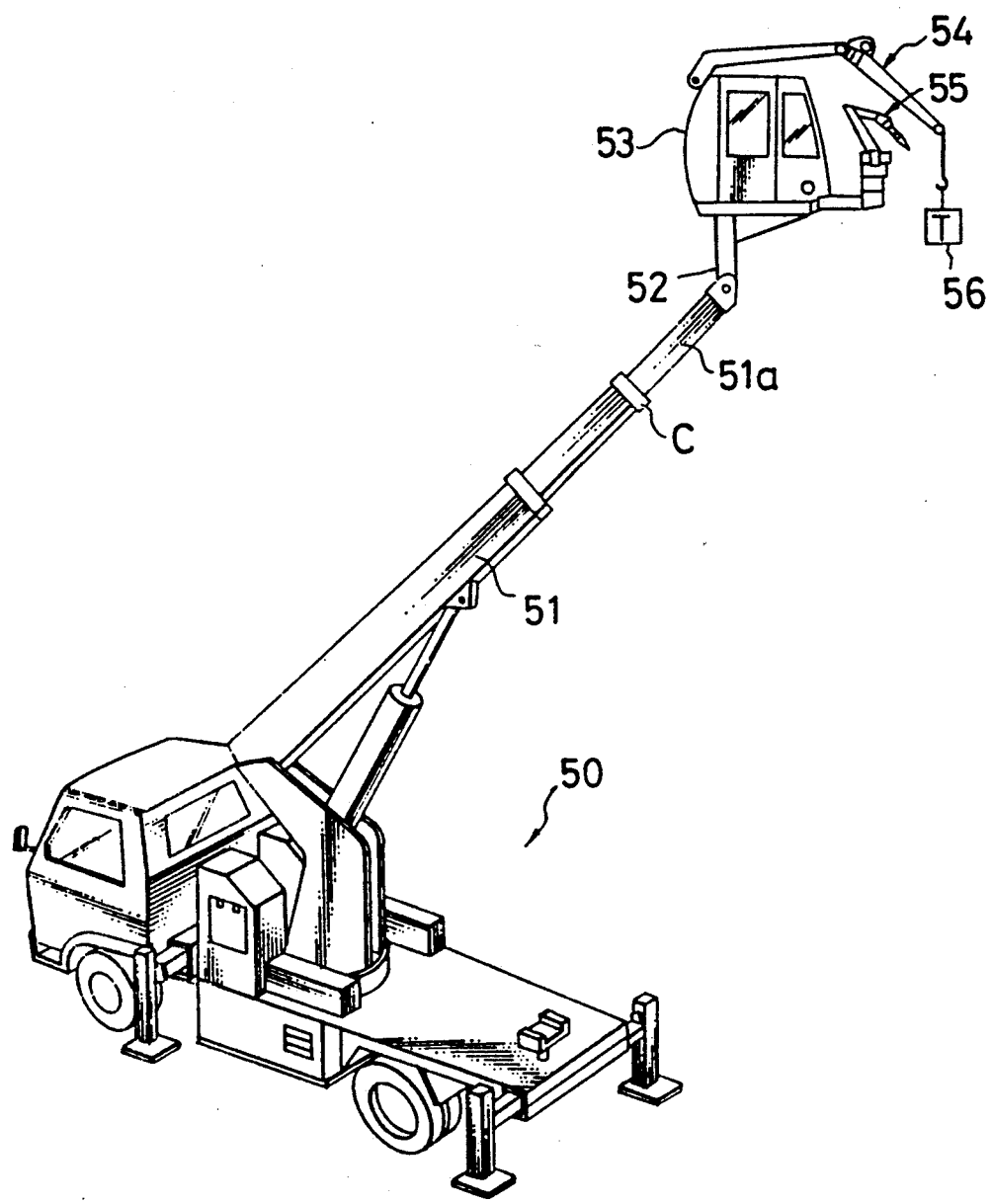
FIG. 7 is a perspective view of a conventional mobile vehicular apparatus with an aerial working device.
Figure 8:
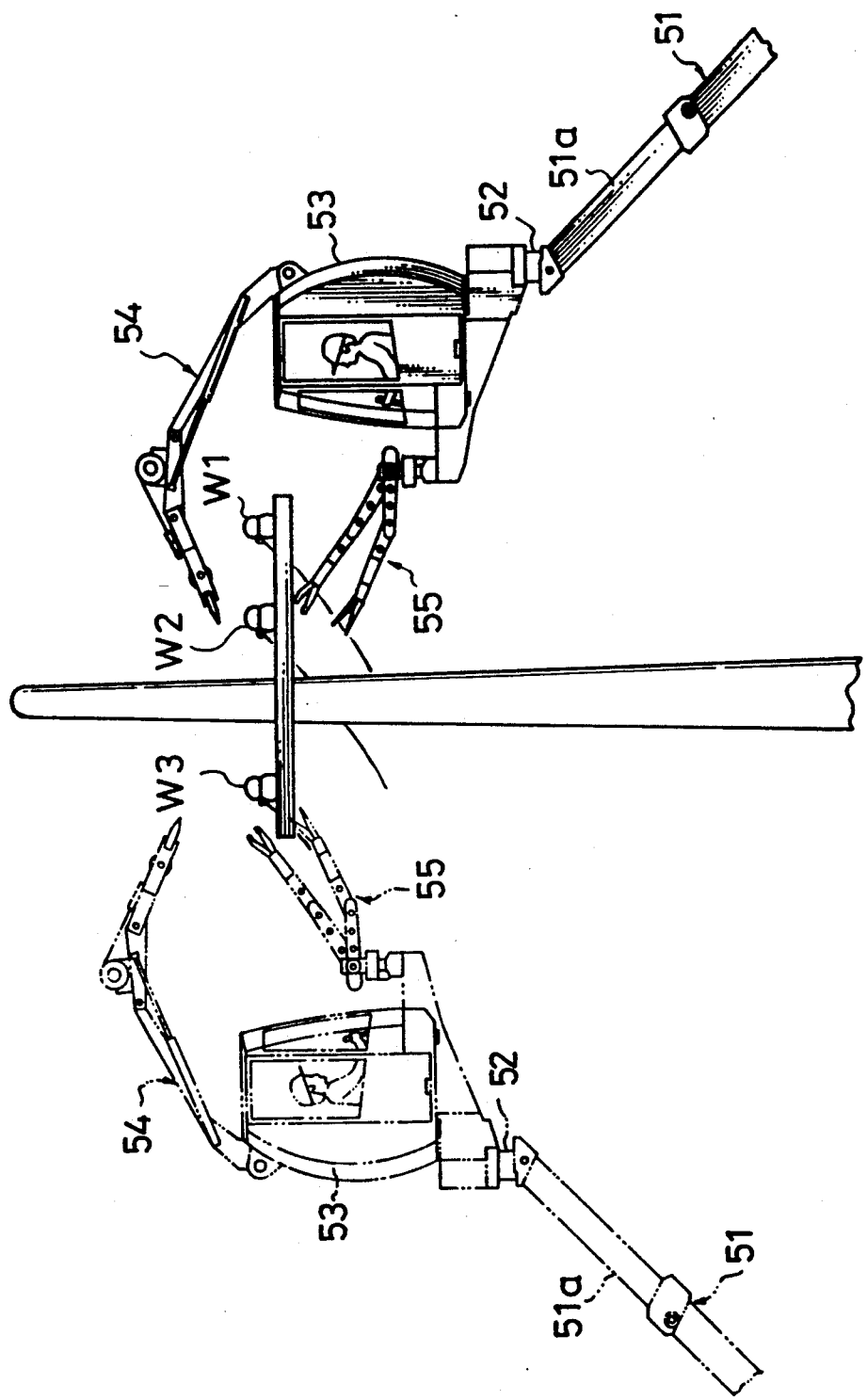
FIG. 8 is a side elevational view of an aerial control cabin and associated components of the conventional mobile vehicular apparatus shown in FIG. 7.

The mobile vehicular apparatus shown in FIG. 5 has a mobile vehicle 100 having a driver's cabin 1a and a vehicle body 1b on which a telescopic boom 3 is mounted. An aerial control cabin 6 is mounted through a slide mechanism 20 on a cabin support shaft 5 which is vertically mounted on the tip end of the distal boom member 3c of the boom 3.

The slide mechanism 20, which is similar to the slide mechanism 10 according to the first embodiment, comprises a guide base 21 mounted on the cabin support shaft 5 for horizontal turning movement about the axis of the cabin support shaft 5. Slider 22 is slidably mounted on guide base 21 through a plurality of rollers 23 interposed therebetween. Slider 22 is slidable back and forth with respect to guide base 21, and slide cylinder 24 is operatively coupled between guide base 21 and slider 22 for slidingly moving slider 22 back and forth with respect to guide base 21. Control cabin 6 is supported on slider 22.

Auxiliary boom 7 extends forwardly from an upper rear end of the control cabin 6. Manipulator device 8 is mounted on support arm 25 which extends forwardly and is fixed to guide base 21. When slider 22 moves back and forth, therefore, control cabin 6 and auxiliary boom 7 move back and forth in unison with each other, but manipulator device 8 remains in position.

With the mobile vehicular apparatus according to the second embodiment, control cabin 6 and auxiliary boom 7 are movable in a spatial range that is a combination of the range in which boom 3 can be raised and lowered, extended and contracted, and turned, the range in which control cabin 6 can be rotated about cabin support shaft 5, and the range in which control cabin 6 is movable back and forth by slide mechanism 10 supporting control cabin 6. When an object such as a transformer is to be suspended by auxiliary boom 7, therefore, control cabin 6 and auxiliary boom 7 are positionally adjusted by slide mechanism 20 in order to minimize moments exerted to boom 3.

In the second embodiment, as described above, only the control cabin 6 and the auxiliary boom 7 slide back and forth with respect to the boom 3. Manipulator 8 does not move back and forth with respect to the boom 3. Accordingly, the relative position of control cabin 6 and auxiliary boom 3 with respect to manipulator device 8 can be adjusted back and forth. To install first- and second-phase electric wires W1, W2 on a post as shown in FIG. 6, the mobile vehicular apparatus is positioned as closely to the shoulder of the road as possible, boom 3 is set to the best position, and control cabin 6, manipulator device 8, and auxiliary boom 7 are turned and swung, and operated for the installation of the electric wires W1, W2. To install a third-phase electric cable W3 which is located farthest from control cabin 6, slide cylinder 24 of slide mechanism 20 is supplied with working oil to move only control cabin 6 and auxiliary boom 7 rearwardly with respect to boom 3, thus widening the relative distance between control cabin 6 and manipulator device 8. Control cabin 6 is now positioned clear of the first-phase electric cable W1 that is closest to control cabin 6. Then, boom 3 is moved to the two-dot-and-dash-line position to bring the control cabin 6 closer to the first-phase electric cable W1. Therefore, grippers on the distal ends of manipulators of the manipulator device 8 are now positioned closely to the third-phase electric cable W3 which is most remote from control cabin 6. Manipulator device 8 is then controlled to install the electric cable W3 on the post.

With the mobile vehicular apparatus according to the second embodiment, control cabin 6 supported on boom 3 through slide mechanism 20 is slid back and forth by cylinder 24 to increase the relative distance between control cabin 6 and We manipulator device 8, allowing manipulator device 8 to install the electric cable W3 which is farthest from control cabin 6. The position in which the mobile vehicular apparatus is held is, not required to be changed, and boom 3 is also not required to be extended and contracted and turned for the processing or handling of the remotest electric cable W3. Since control cabin 6 is easy to operate for complex jobs or tasks, the mobile vehicular apparatus is efficient in operation.

Although certain preferred embodiments have been shown and described, it should be understood that many changes and modifications may be made therein without departing from the scope of the appended claims.

What is claimed is:

1. A mobile vehicular apparatus comprising:
    a boom;
    an aerial control cabin mounted on a tip end of said boom by a vertical shaft for turning movement about the vertical shaft;
    an aerial working device disposed in front of said aerial control cabin; and
    a slide mechanism which interconnects said vertical shaft and said cabin for moving said aerial control cabin back and forth horizontally with respect to said boom; wherein said slide mechanism moves horizontally at all times and comprises a guide base mounted on said vertical shaft for turning movement thereabout, a slider mounted on said guide base so as to be movable back and forth with respect to said guide base, and actuator means for sliding said slider with respect to said guide base, said aerial control cabin being disposed on said slider, wherein said aerial working device comprises a manipulator device, said manipulator device being connected to a front end of said guide base.

2. A mobile vehicular apparatus according to claim 1, wherein said actuator means comprises a hydraulic cylinder.

3. A mobile vehicular apparatus comprising:
    a boom;
    an aerial control cabin mounted on a tip end of said boom by a vertical shaft for turning movement about the vertical shaft;
    an aerial working device disposed in front of said aerial control cabin; and
    a slide mechanism which interconnects said vertical shaft and said cabin for moving said aerial control cabin back and forth horizontally with respect to said boom; wherein said slide mechanism moves horizontally at all times and comprises a guide base mounted on said vertical shaft for turning movement thereabout, a slider mounted on said guide base so as to be movable back and forth with respect to said guide base, and actuator means for sliding said slider with respect to said guide base, said aerial control cabin being disposed on said slider, wherein said aerial working device comprises a manipulator device and an auxiliary boom having a hanger device, said manipulator device being connected to a front end of said guide base, said auxiliary boom being supported on said aerial control cabin.

4. A mobile vehicular apparatus according to claim 1, wherein said boom is vertically swingable about a bottom pivot connection.

5. A mobile vehicular apparatus according to claim 3, wherein said actuator means comprises a hydraulic cylinder.

6. A mobile vehicular apparatus according to claim 3, wherein said boom is vertically swingable about a bottom pivot connection.

* * * * *